US011394930B2

(12) United States Patent
Triano

(10) Patent No.: US 11,394,930 B2
(45) Date of Patent: Jul. 19, 2022

(54) FILTERING AND CORRELATING RADIO SIGNALS BASED ON A FIELD OF VIEW OF A CAMERA

(71) Applicant: AT&T Intellectual Property I, L.P., Atlanta, GA (US)

(72) Inventor: Stephen Francis Triano, Hillsborough, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 280 days.

(21) Appl. No.: 16/599,510

(22) Filed: Oct. 11, 2019

(65) Prior Publication Data

US 2021/0112222 A1    Apr. 15, 2021

(51) Int. Cl.
*H04N 5/232* (2006.01)
*H04N 7/18* (2006.01)
*H04N 5/225* (2006.01)
*H04N 13/296* (2018.01)

(52) U.S. Cl.
CPC .......... *H04N 7/185* (2013.01); *H04N 5/2252* (2013.01); *H04N 5/23206* (2013.01); *H04N 13/296* (2018.05)

(58) Field of Classification Search
CPC .. H04N 7/185; H04N 5/2252; H04N 5/23206; H04N 13/296; H04N 5/23218; H04N 5/23299; H04N 7/183
See application file for complete search history.

(56) References Cited

U.S. PATENT DOCUMENTS

| 8,531,523 | B2* | 9/2013 | Anderson | H04W 4/029 348/143 |
|---|---|---|---|---|
| 2019/0049537 | A1* | 2/2019 | Popescu | G01R 33/422 |
| 2020/0294293 | A1* | 9/2020 | Boenig, II | G06T 11/60 |
| 2022/0050936 | A1* | 2/2022 | Kincart | G06T 17/05 |

* cited by examiner

*Primary Examiner* — Timothy J Henn
*Assistant Examiner* — Angel L Garces-Rivera
(74) *Attorney, Agent, or Firm* — Amin, Turocy & Watson, LLP

(57) ABSTRACT

Architectures and techniques are presented that can record video data and wireless communication device data. Signals from sources outside a field of view of a camera recording the video data can be filtered. Such can affect a shielding technique in which a signal shielding apparatus is adjusted in orientation based on an orientation of a camera device. Techniques are further presented to synchronize, according to time, video data and device data. Such synchronization can allow for improved correlation between visual objects (e.g., recorded by the camera) and radio objects (e.g., recorded by a transceiver). For example, visual techniques can be employed to estimate distance/locomotion of a visual object, whereas signal strength metrics can be used to estimate distance/locomotion of a radio object, and the relationship between the two can indicate a strong correlation that a particular device ID is linked to a particular visual object and vice versa.

20 Claims, 11 Drawing Sheets

EXAMPLE OBJECTS IDENTIFIED

| Object Type | Properties | Radio ID Example | Notes |
|---|---|---|---|
| Person | Can move | Smart phone, watch, Fitbit | A person may not have any Radio ID |
| Building | Can't move | One to many routers, Wi-Fi devices, occupants with smart phones, security systems, etc. | In this case the objects with IDs won't be visible to a camera if they are inside. However the radios inside may move. So routers typically stay stationary as were people move around with their phones. |
| Car | Can Move but also be stationary for a time period | Smart Car, occupants with smart phones | There may be multiple occupants with multiple devices |
| Outside stationary radio | Can't move | Outdoor Wi-Fi hotspot | Device may power cycle. |

FIG. 5

EXAMPLE CORRELATION SCENARIO

| Day | Observed | Radio ID Correlated | Notes |
|---|---|---|---|
| 1 | 1 FE passes | 1A, 1K | 1 refers to the first red late model Ford Escape that passes for that day. The letter is the unique radio ID. So 2 IDs passed when that car passed |
| 2 | 3 FE passes | 1D, 1E, 2F, 3A, 3Q | 1st and 3rd car have 2 radio IDs correlated |
| 3 | 2 FE passes | 1A, 1Q, 2N | So now we see radio ID "A" all days |
| 4 | 1 FE passes | 1A, 1K | So we see radio ID A, K and Q associated together but only A appears all days. We will assume A is the driver. In addition object recognition engine has identified radio ID A with a FE that has tinted windows. |
| 5 | 3 FE passes | 1G, 1H, 2A, 3L, 3D | A pedestrian is hit by the 2nd FE that passes and the driver takes off. VaRIC recorded it and correlates radio ID "A" as being in the car with the tint. Police get a warrant to identify the owner of the radio ID "A". The owner also owns a 2018 red Escape and it has collision damage. Case closed. |

FILTERING AND CORRELATING RADIO SIGNALS BASED ON A FIELD OF VIEW OF A CAMERA

TECHNICAL FIELD

The present application relates generally to filtering signals outside a field of view of a camera and correlating signals received from the field of view to an object imaged by the camera.

BACKGROUND

Surveillance cameras and other imaging devices are commonly used for security. For example, these cameras might capture an image of a trespasser or other law-breaker, which can be used to identify a party responsible for injury or loss or damage to property, for instance. In a different technological domain, transceivers can be used to communicate with other wireless devices. For example, a transceiver can receive information from wireless devices that are in range. Furthermore, the transceiver can 'ping' devices that are in range by transmitting a request for information.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which:

FIG. 5 depicts an example block diagram that provides examples of the object recognition procedure that can be identified and/or classify objects based on analysis of video data in accordance with certain embodiments of this disclosure;

FIG. 6 is an example block diagram that illustrates an example correlation scenario over a five day period in accordance with certain embodiments of this disclosure;

DETAILED DESCRIPTION

Overview

Figure 1:
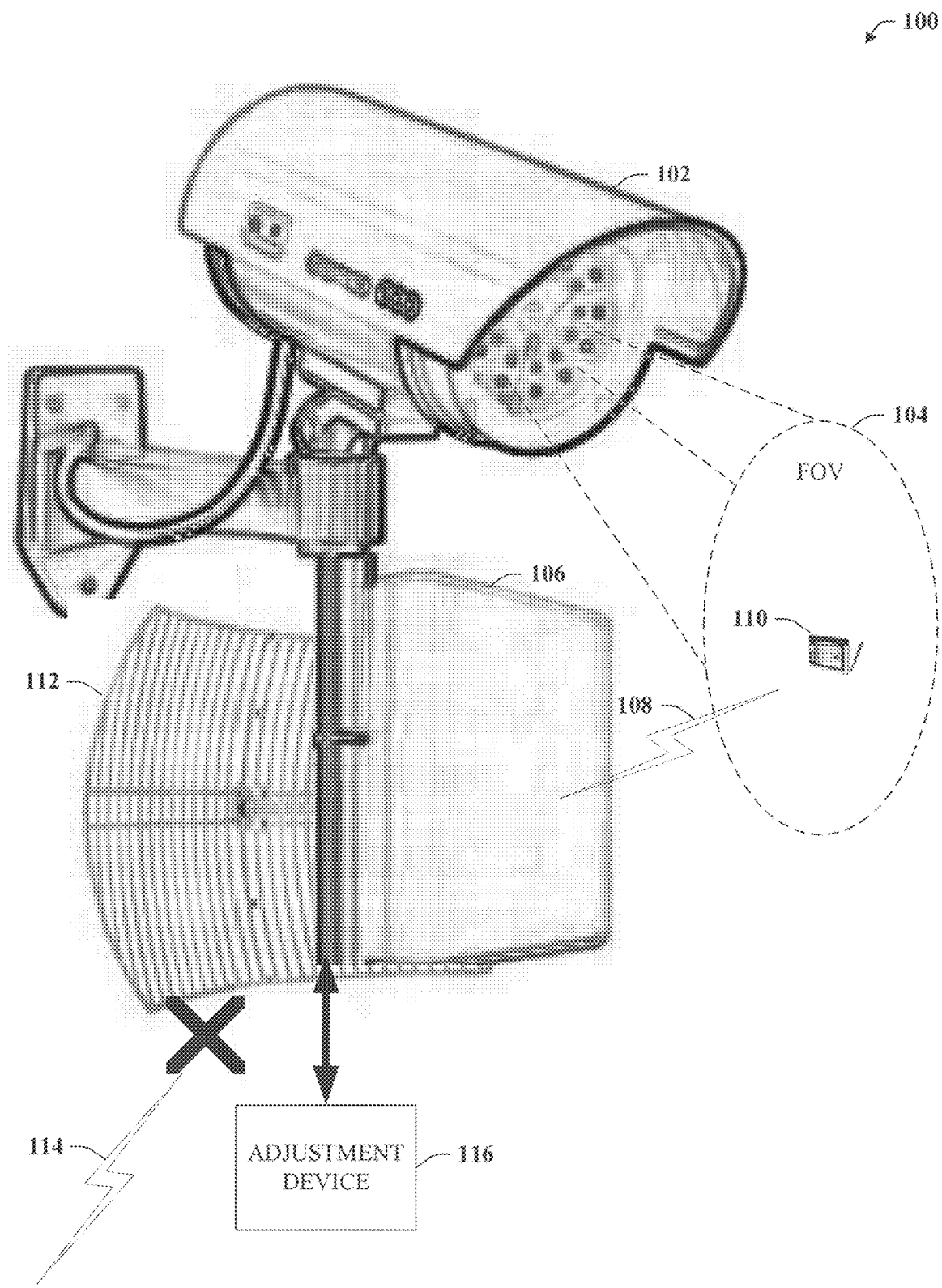
FIG. 1 illustrates a block diagram illustrating an example receiving device that can be configured to receive and/or record visual images and/or signals originating from a wireless device in accordance with certain embodiments of this disclosure.

Many people today have a security system of some type that uses cameras or other imaging devices. For example, door cameras represent a known type of security system that is gaining in popularity throughout the world. Examples exist in which a door camera or other security device has led to the identification of a trespasser or other lawbreaker. One potential issue with cameras is that in many cases, clear identification is not possible. For example, the image might not be sufficiently clear, or the actor captured on video might have made efforts to conceal identity, or both. Examples also exist of security camera footage where the video or image quality is so poor or for other reasons, unique identification of a person or object is not clear.

Today, most people carry or wear a device capable of wireless communication (e.g., smart phone, watch, bracelet, glasses, biometric device, etc.). Furthermore, numerous inanimate objects (e.g., cars, access point devices, etc.) have a growing number of devices that communicate wirelessly. Whether attached to a person or object, these wireless devices have unique identifiers that are typically communicated in order to establish wireless communication with other devices. Generally, signals transmitted by the wireless device can be used to locate the wireless device in time and space. For instance, certain characteristics of the signals can be recorded by an access point device or transceiver, which can be employed to locate a physical location of the wireless device, but there are no associated visual images, of course.

Based on these observations, techniques of the disclosed subject matter can be employed to help identify persons or objects that are imaged by a camera device when those persons or objects also have a wireless device. In some embodiments, such can be accomplished via video and radio identification correlation (VaRIC). In some embodiments, the disclosed subject matter can use a combination of existing technologies such as but not limited to: digital video recording, mobile device technology, cell service, wireless fidelity (Wi-Fi), Bluetooth, near field communication (NFC), radio frequency identification (RFID), visual, facial, and object recognition, machine learning, artificial intelligence, encryption, internet cloud storage, location via directional antennas, trilateration, or GPS. Devices detailed herein can record video data, comprising video or images. The same or other devices can record device data that can comprise values for received signal strength indicating (RSSI) or another signal parameter, which can be employed to determine wireless device location. The same or other devices can then correlate the video data to the device data.

It is appreciated that a location of the recording device can be known and recorded via GPS or other techniques. The recording device can further comprise a transceiver with, e.g., location-identifying directional antennas capable of recording a signal strength metric (e.g., RSSI) to identify a distance and, if moving, a direction and rate of travel from wireless devices such as but not limited to cell phones, Internet-of-things (IoT) device, connected cars, Wi-Fi and Bluetooth devices, etc. In some cases the transceiver can "ping" wireless devices in range to prompt a response that transmits unique device identifiers such as but not limited to international mobile subscriber identity (IMSI), electronic serial number (ESN), mobile equipment identifier (MEID), international mobile station equipment identity (IMEI), a Wi-Fi media access control (MAC) address, basic service set identifier (BSSID), Bluetooth MAC address, NFC unique identifier (UID), and RFID transponder identifier (TID). The recording device(s) can record the video and the unique identifiers associated with the wireless device, and tag with a time sync stamp for visual correlations.

The transceiver device can cover an area the same as the camera field of view, which can include filtering out signals from devices that are outside this field of view. In some embodiments, the video can display an overlay of annotated labels on the objects that are determined to be the transmission source of a unique radio identifier. In some embodiments, machine learning or artificial intelligence can be used to filter out a lot of the identifiers that may not be of interest. For example, there can be Wi-Fi routers in buildings that are static in nature. When there is an object that is new or in motion, a newly transmitted identifier it can be mapped to that object. For instance, a person carrying cell phone, a smart car, a person traveling in a bus with a cell phone, etc. As persons or objects move in the path of the camera's vision over time the correlation device(s) can learn the identification correlation. For example, on a crowed street each day a number of people walk by the camera, the system can use facial recognition and learn to correlate the unique identifiers that were received when that person walks by. Therefore, the system can learn the people who walk by every day and therefore be able to filter and identify new people or objects and potentially generate a historic or predictive schedule. The same or similar techniques can be employed with regard to connected cars or persons in cars with cell phones or other suitable wireless devices.

In some embodiments, the video data and/or the device data can be uploaded to a cloud server for processing. For instance, the correlation device can exist in the cloud rather than local to the camera and/or transceiver device(s). In addition to sending the data to the cloud a "net" or mesh can be formed using data from multiple VaRIC devices, even thousands to help with the correlation. Due to security and privacy concerns a two-step process can be implemented to protect user identities. First, for example, the unique identifiers can use data anonymization and only be decrypted by the VaRIC device recording company with a court order. Information can be stored on cloud storage, e.g. like many door camera video systems. Hence, the same privacy protections afforded to court order process can protect privacy, while still being capable of useful identification results in suitable situations, e.g., to obtain an identity of an actor demonstrated to have committed a crime.

Example Systems

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawings, with initial reference to FIG. 1, receiving device 100 is depicted. Receiving device 100 can be configured to receive and/or record visual images and/or signals originating from a wireless device in accordance with certain embodiments of this disclosure. For example, receiving device 100 can include camera device 102. Camera device 102 can generate video data indicative of visual images of a field of view (FOV) 104 of camera device 102. It is understood that FOV 104 can include occluded spaces. For example, a building or other object in FOV 104 might occlude surrounding objects such that those occluded objects are not visible to camera device 102. As used in some embodiments herein, FOV 104 is intended to represent a physical, geometric space that is not necessarily limited to objects that can be imaged by camera device 102. Thus, one object that is occluded by another might never be imaged by camera device 102, but nonetheless can be considered to be within FOV 104. In other embodiments, FOV 104 can be limited to spaces and/or objects that can be imaged by camera device 102, and therefore might exclude spaces that are occluded by objects.

Receiving device 100 can further comprise transceiver 106. Transceiver 106 can be configured to receive first signals 108 from wireless device 110. As introduced above, first signals 108 can comprise information from which device data can be derived. For example, device data can include a unique identifier of some type for wireless device 110 as well as signal strength values from which one or more of: a distance, a location, a direction of travel, or a rate of travel can be computed.

Video data including objects imaged by camera device 102 can then be correlated with device data derived from first signals 108 that are received by transceiver 106. However, it is observed that efforts to correlate objects in FOV 104 to corresponding wireless devices 110 can be significantly improved by filtering second signals 114 that originate from sources that are outside FOV 104. For example, an object that is outside FOV 104 cannot be imaged by camera device 102 and therefore associated images to be correlated do not exist. Thus, in some embodiments, second signals 114, e.g., those having a source that is outside FOV 104 can be treated as noise and filtered.

Filtering (e.g., blockings, impeding, discarding, etc.) second signals 114 can be accomplished by way of physical shielding techniques, which are now discussed. In some embodiments, filtering can be accomplished by way of software determinations or techniques, which is further detailed in connection with FIG. 4. Physical shielding and software filtering are not mutually exclusive. Rather, some embodiments can employ a combination of both techniques to filter second signals 114.

Receiving device 100 can further include shielding device 112. Shielding device 112 can be comprised of a material that causes a Faraday cage effect or can be disposed with suitable shielding foam or adhesives, or the like. Shielding device 112 can be any suitable shape or size and will typically 'wrap-around' or enclose transceiver device 106 to some degree. In some embodiments, shielding device 112 can have wings or flaps that are adjustable to increase or decrease the direction or angle of first signals 108 that are permitted to be received. In some embodiments, shielding device 112 has a fixed geometry that can be displaced relative to transceiver device 106 to affect changes in receipt of first signals 108.

Significantly, shielding device 112 can be configured to permit receipt of first signals 108, e.g., those signals originating from a wireless device 110 that is determined to be within FOV 104. Concurrently, shielding device 112 can be configured to prevent receipt of second signals 114, e.g., those signals originated from sources determined to be outside of FOV 104.

In some embodiments, receiving device 100 can further comprise adjustment device 116. Adjustment device 116 can be, e.g., an actuator, motor, stepper motor or the like. Adjustment device 116 can be configured to adjust orientations of any or all of camera device 102, transceiver device 106, and shielding device 112. In some embodiments, adjustments by adjustment device 116 can affect camera device 102, transceiver device 106 and/or shielding device 112 independently, while in other embodiments, two or more of the adjustments can be performed together, potentially in unison and/or in a uniform manner.

For example, in some embodiments, adjustment device 116 can be configured to change a first orientation of camera device 102, resulting in a corresponding change to FOV 104. Because it is of interest to permit or prohibit signals based on whether those signals originate from within FOV 104, as FOV 104 changes due to the first orientation change, adjustment device 116 can, in response change a second orientation of shielding device 112. For example, adjustment device 116 can change the second orientation of shielding device 112 corresponding to the first orientation.

As an example, suppose camera device pans to the left, thereby shifting the associated FOV 104 to the left. In response or in tandem, adjustment device 116 can pan shielding device 112 to the left as well. It is appreciated that changes in FOV 104 can be due to moving/panning camera 102, but might also arise due to zooming in/out. Hence, as used herein, the concept of changing the first orientation can include changes in line-of-sight as well as changes in zoom factor, and either one or both can be satisfied by changes to the second orientation of shielding device 112.

Figure 2:
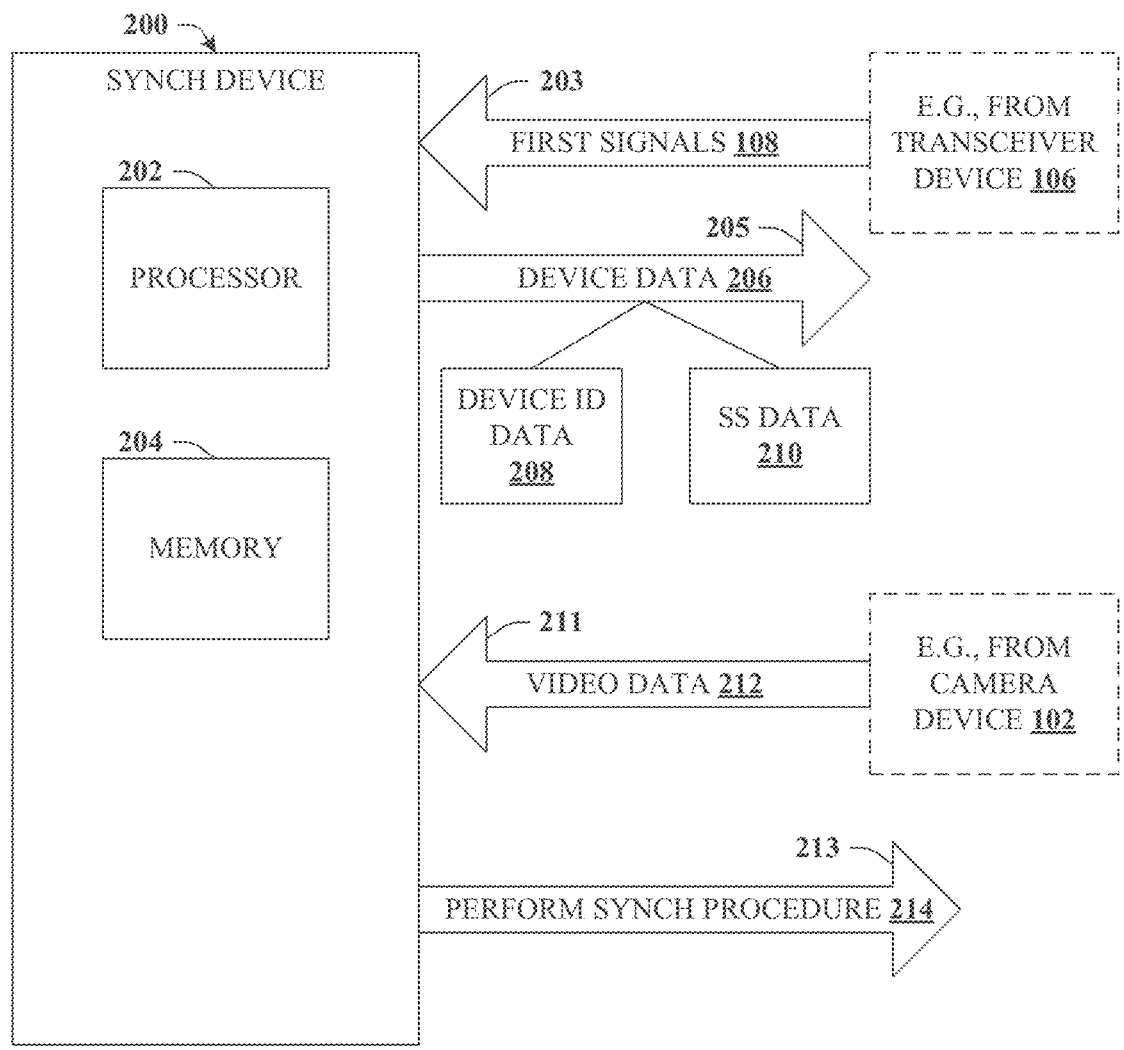
FIG. 2 is a block diagram illustrating an example synch device that can perform a synchronization procedure in accordance with certain embodiments of this disclosure.

Turning now to FIG. 2, synch device 200 is depicted. Synch device 200 can perform a synchronization procedure in accordance with certain embodiments of this disclosure. In some embodiments, synch device 200 can be included in receiving device 100. In some embodiments, synch device 200 can be remote from receiving device 100, for example, situated at a data center or instantiated in a cloud environment. Generally, synch device 200 can comprise a processor 202 and a memory 204 that stores executable instructions that, when executed by the processor, facilitate performance of operations. Further examples of the memory 204 and processor 202 can be found with reference to FIG. 11. It is to be appreciated that the computer 1102 can represent a server device of a communications network or a user equipment device and can be used in connection with implementing one or more of the systems, devices, or components shown and described in connection with FIG. 2 and other figures disclosed herein.

As indicated at reference numeral 203, synch device 200 can receive first signals 108, or relevant information from first signals 108. In some embodiments, such can be received from transceiver device 106. In response to receiving first signals 108, synch device 200 can generate device data 206, as indicated by reference numeral 205. Device data 206 can comprise device identifier data 208 and signal strength data 210. Device identifier data 208 can be indicative of an identifier of the device that transmitted first signals 108. For example, wireless device 110. Signal strength data 210 can be indicative of a signal strength metric (e.g., RSSI) of first signals 108. It is appreciated that device data 206 can thus be employed to determine both a unique identifier (e.g., device identifier data 208) for wireless device 110 and determine a distance between wireless device 110 and receiving device 100, a direction of travel of wireless device 110 relative to receiving device 100, and a rate of travel of wireless device relative to receiving device 100.

As illustrated at reference numeral 211, synch device 200 can receive (e.g., from camera device 102), video data 212. Video data 212 can represent visual images of FOV 104 captured by camera device 104. As illustrated at reference numeral 213, synch device 200 can further perform synchronization procedure 214. Synchronization procedure 214 can comprise synchronizing, according to time, video data 212 to device data 206. For example, by synchronization video data 212 and device data 206, such can allow for objects that are moving or stationary during a defined time to be synchronized with signal strength data 210 to identify whether or not wireless device 110 was moving or stationary during the defined time. As such, objects of video data 212 can be correlated with wireless device 110 to some degree of confidence, which is further detailed in connection with FIG. 3.

Figure 3:
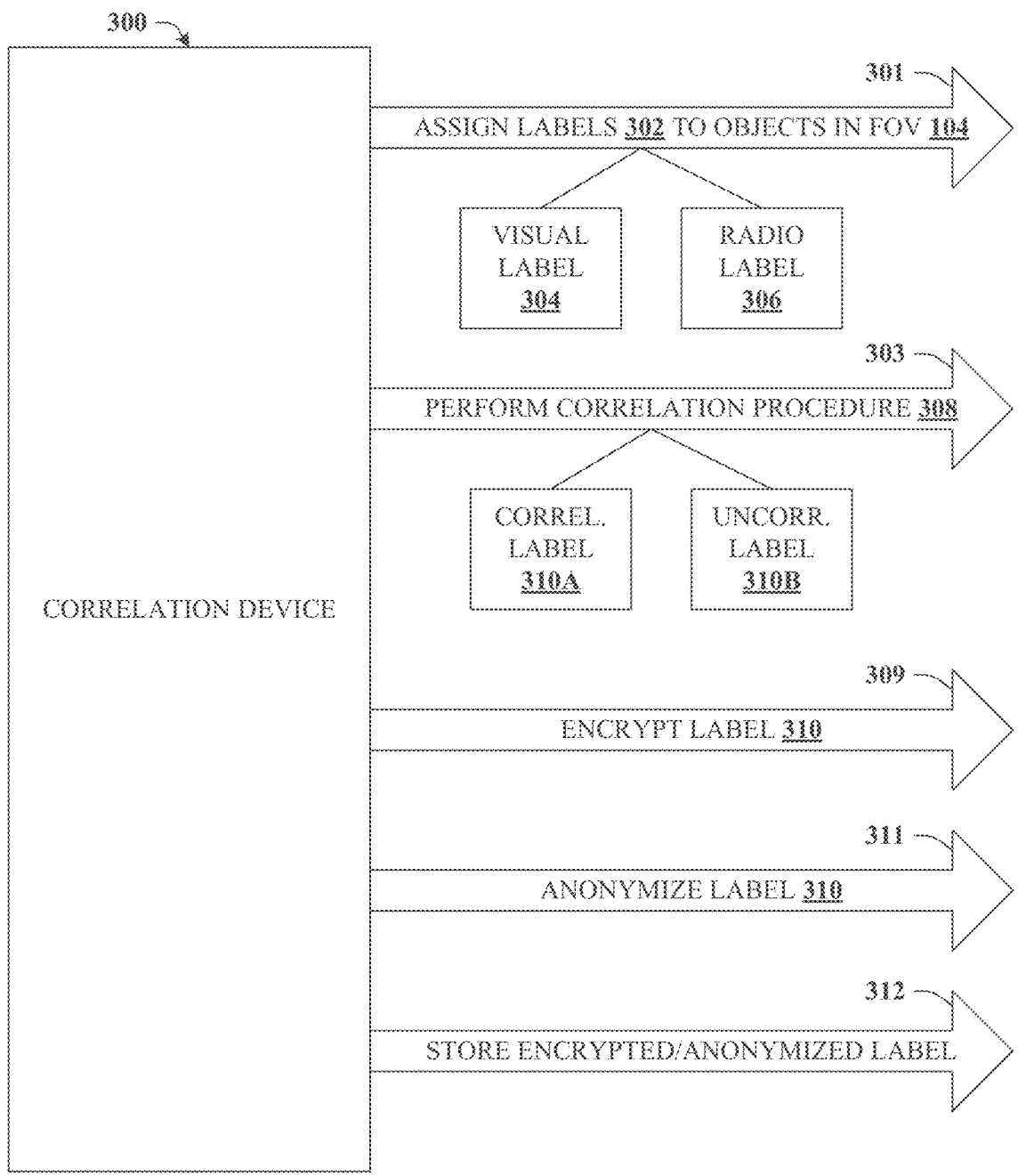
FIG. 3 depicts a block diagram of an example system illustrating a correlation device that can correlate visual objects in a FOV of a camera to radio objects in accordance with certain embodiments of this disclosure.

With reference now to FIG. 3, correlation device 300 is depicted. Correlation device 300 can correlate visual objects in a FOV of a camera to radio objects in accordance with certain embodiments of this disclosure. Correlation device 300 can be included in synch device 200 or can be a separate device. Correlation device 300 can be included in receiving device 100 or be situated remotely from receiving device 100, such as in a data center or cloud environment.

As depicted by reference numeral 301, in some embodiments, correlation device 300 can assign labels 302 to respective objects in FOV 104. Labels 302 can take multiple forms. For example, an object that is identified based on a visual analysis of FOV 104 and/or video data 212 can be assigned visual label 304. On the other hand, an object that is identified based on a radio signals and/or device data 206 can be assigned radio label 306. As shown at reference numeral 303, correlation device 300 can perform correlation procedure 308. Correlation procedure 308 can match visual label 304 (e.g., assigned to an object visible in video data 212) to radio label 306 (e.g., assigned to an object that transmits from FOV 104).

Figure 4:
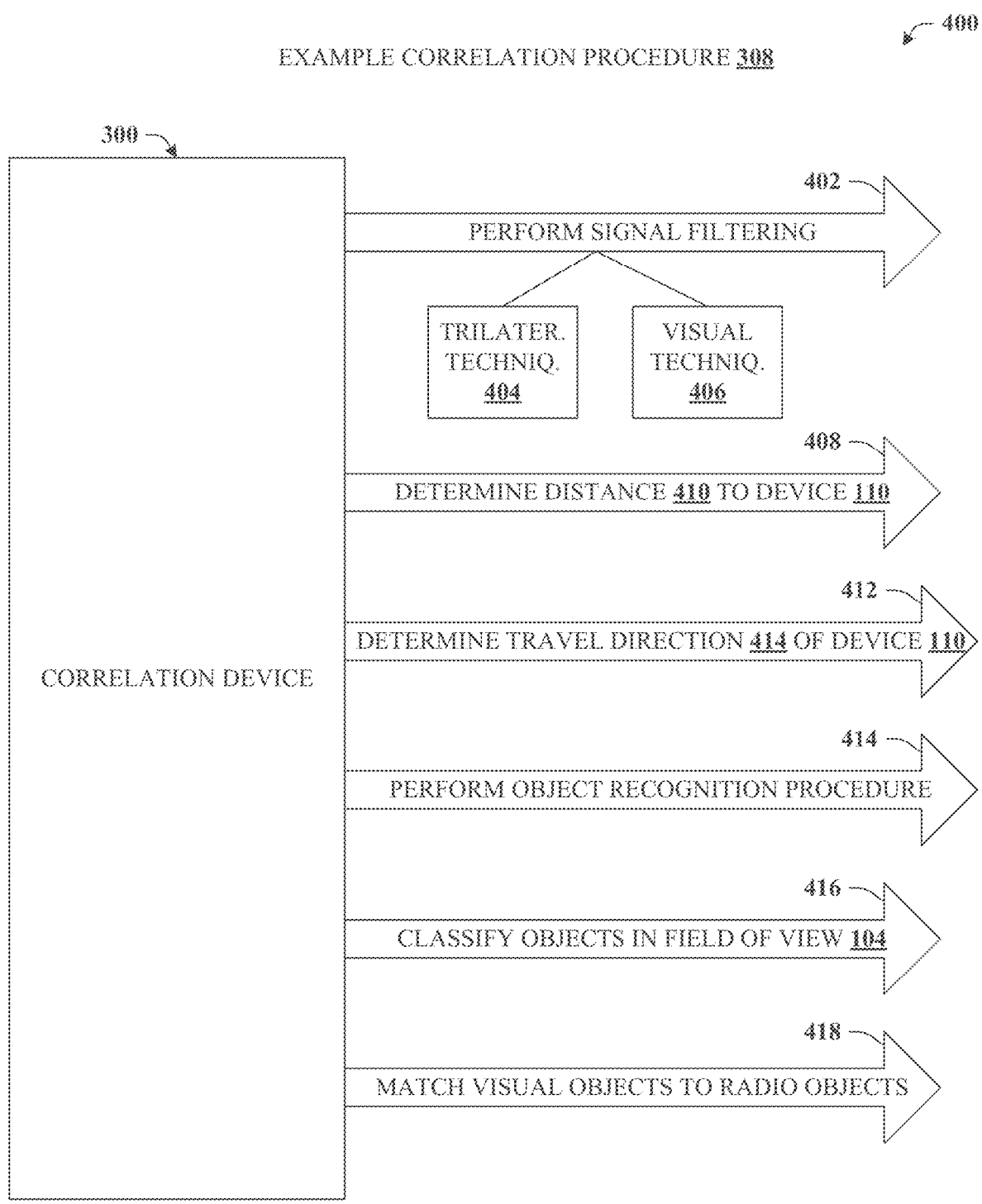
FIG. 4 depicts a block diagram of an example system illustrating additional aspects or elements of the correlation device in connection with the correlation procedure in accordance with certain embodiments of this disclosure.

Additional detail regarding correlation procedure 308 can be found at FIG. 4. However, as a result of correlation procedure 308, all or a portion of identified visual objects can be matched to corresponding radio objects. For example, if a visual label 304 can be matched with a high degree of confidence to an associated radio label 306, then the result can be correlated label 310A. Otherwise, if a visual label 304 or radio label 306 cannot be paired, then the result can be uncorrelated label 310B.

In some embodiments, a given label 310, whether correlated label 310A or uncorrelated label 310B, can be encrypted, as indicated at reference numeral 309. Such can potentially assuage certain privacy concerns. In some embodiments, a given label 310 can be anonymized, as illustrated at reference numeral 311. Such can further mitigate certain privacy concerns. At reference numeral 312, correlation device 300 can store the encrypted/anonymized label 310 to a data store. Associated histories of time-synched video data 212 and device data 206 can also be stored to the data store. In some embodiments, for example based on these time-synched histories, schedules for objects and/or associated labels can be generated. These schedules can be representative of history or predictive in nature.

Referring now to FIG. 4, correlation device 300 is again depicted. FIG. 4 illustrates additional aspects or elements in connection with the correlation procedure in accordance with certain embodiments of this disclosure. For example, at reference numeral 402, signal filtering can be performed. As indicated previously, shielding device 112 can provide physical shielding that can filter second signals 116 (e.g., signals determined to originate outside of FOV 104). In addition to or instead of physical shielding, software filtering can be performed to filter out signals that do not originate from FOV 104. In some embodiments, such can be based on trilateration techniques 404. For example, multiple receiving devices 100 might receive first signals 108 from wireless device 110. In some embodiments, visual technique 406 can be employed. For example, consider the case in which it is determined that a radio ID does not correspond to an object that is visible in video data 212. In that case, the signals can be filtered based on the determination that those signals do not originate within FOV 104. It is appreciated that visual technique 406 can also include a determination of whether there is a visual object (e.g., building, wall, etc.) identified in video data 212 that might potentially occlude other objects. If so, it might be determined that the radio ID corresponds to an object that is not visible to camera 102 by virtue of occlusion but might still be determined to be in FOV 104. It is appreciated that the signal filtering can be based on one or more of the aspects detailed below.

As illustrated at reference numeral 408, correlation device 300 can determine distance 410 to wireless device 110. Generally, distance 410 can be accurately determined by signal strength measurements, which can be determined from device data 206 and/or signal strength data 210. Additionally, as illustrated by reference numeral 412, correlation device 300 can determine whether wireless device 110 is moving and, if so, a travel direction 414 as well as a rate of travel. In some embodiments, such can be determined based on variations of signal strength measurements over time.

Reference numeral 416 refers to an object recognition procedure that can be performed by correlation device 300. In some embodiments, the object recognition procedure can identify a classification of an object in video data 212. Based on the classification, correlation device 300 can further determine whether the object is likely to exhibit locomotion. FIG. 5 illustrates non-limiting examples of objects from video data 212 being identified and/or classified.

While still referring to FIG. 4, but turning as well now to FIG. 5, diagram 500 is depicted. Diagram 500 provides examples of the object recognition procedure that can identified and/or classify objects based on analysis of video data 212 in accordance with certain embodiments of this disclosure. For example, the object recognition procedure can identify objects in video data 212 as, e.g., a person, a building, a car or other vehicle, an access point device, or any other suitable object. Furthermore, correlation device 300 can classify all or a portion of the identified objects, e.g., according to whether the object is likely to move or exhibit locomotion. Examples are illustrated in the 'Properties' column.

Still referring to FIG. 4, correlation device 300 can classify objects in FOV 104, which can be according to a locomotion property or another property, as illustrated at reference numeral 416. By classifying objects in such a manner, correlation procedure 308 can be improved. For example, an object that is classified as a stationary object typically will not be correlated with a radio object that was recorded to exhibit motion.

At reference numeral 418, correlation device 300 can match visual objects to radio objects according to the techniques disclosed herein. For example, due to the filtering aspect in which second signals 116 are filtered or discarded, most radio objects that are identified will likely be visible in video data 212, with the possible exception of radio objects that are occluded by other visual objects. Due to the time synching aspect, a locomotion profile (e.g., distance, motion, direction of travel, and rate of travel) of a radio object determined from device data 206 can be matched to a visual object that is determined to share a similar locomotion profile as determined from video data 212 over the same period of time.

Turning now to FIG. 6, diagram 600 is presented. Diagram 600 illustrates an example correlation scenario over a five-day period in accordance with certain embodiments of this disclosure. On day one, video data 212 records an object, which is visually classified as a late-model red Ford Escape (e.g., visual label "1"). Device data 206 identifies two wireless devices (e.g., radio labels "A" and "K") sharing a correlated locomotion profile. It is appreciated that the visual objection identified as a vehicle may also be one of the radio labels (e.g., a connected car) and a driver with a smart phone the other; or it could be inferred that vehicle has at least two occupants with individual wireless devices 110. Typically, radio IDs can be employed to readily determine whether a particular radio ID is a connected car versus a smart phone or other wireless device 110.

On day two, three late-model red Ford Escapes are imaged in video data. The first is correlated with two radio IDs (e.g., "D" and "E"), the second is correlated with one radio ID (e.g., "F"), and the third is correlated with two radio IDs ("A" and "Q"). As the data grows, various inferences can be made with an increasing degree of confidence. For example, since radio ID "A" continually appears in connection with visual label relating to a 'late-model red Ford Escape', it might be inferred that "A" is the owner/driver, while "K" and "Q" are associates or occasional passengers. Now suppose that injury or destruction of property occurs, which is recorded by the same or different camera. The correlation of radio IDs to visual objects can be much more useful than the video alone in identifying a culprit and obtaining a remedy for the victim.

Example Methods

Figure 7:
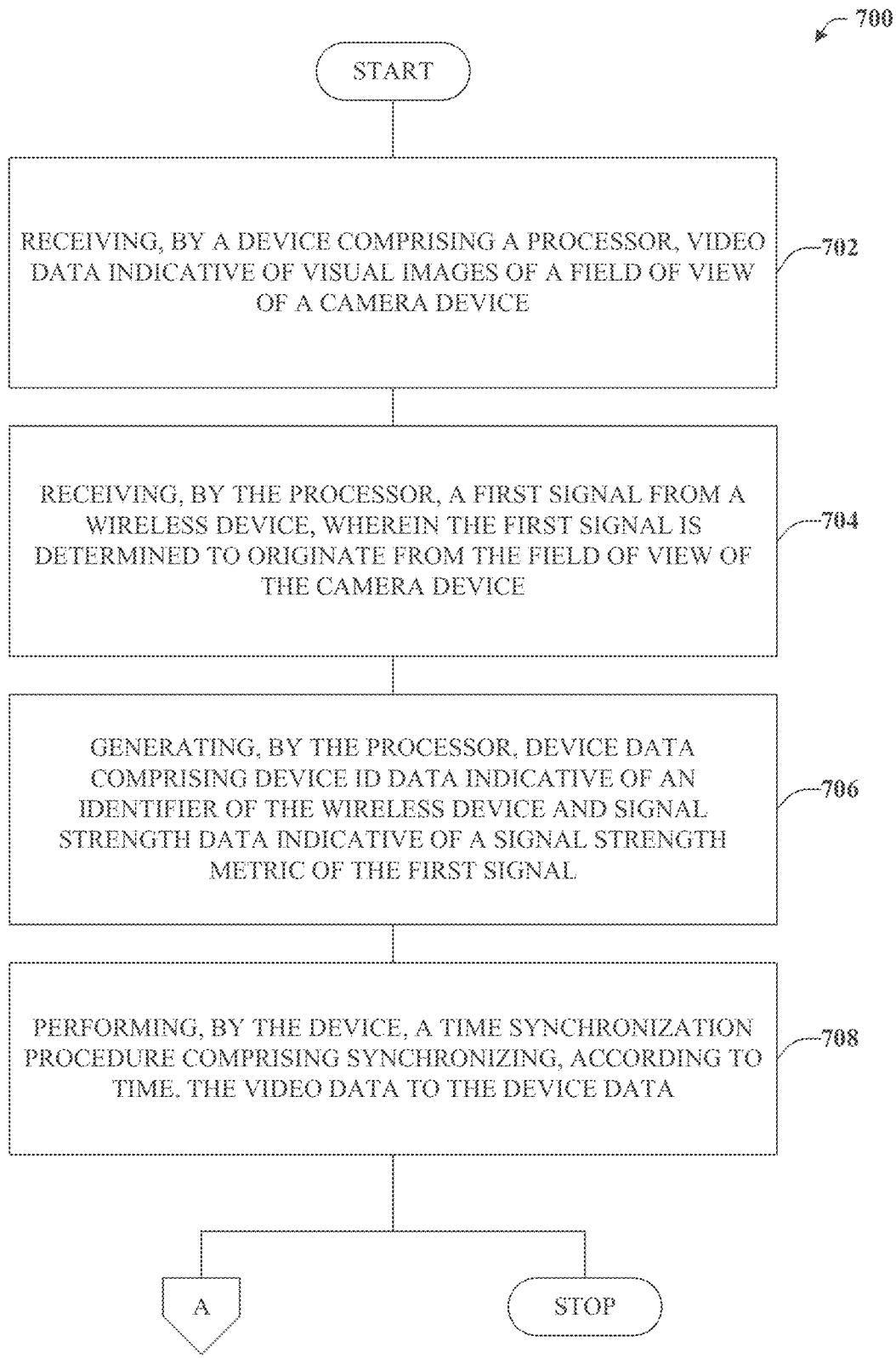
FIG. 7 illustrates an example methodology that can synchronize video data to radio device data in accordance with certain embodiments of this disclosure.
Figure 8:
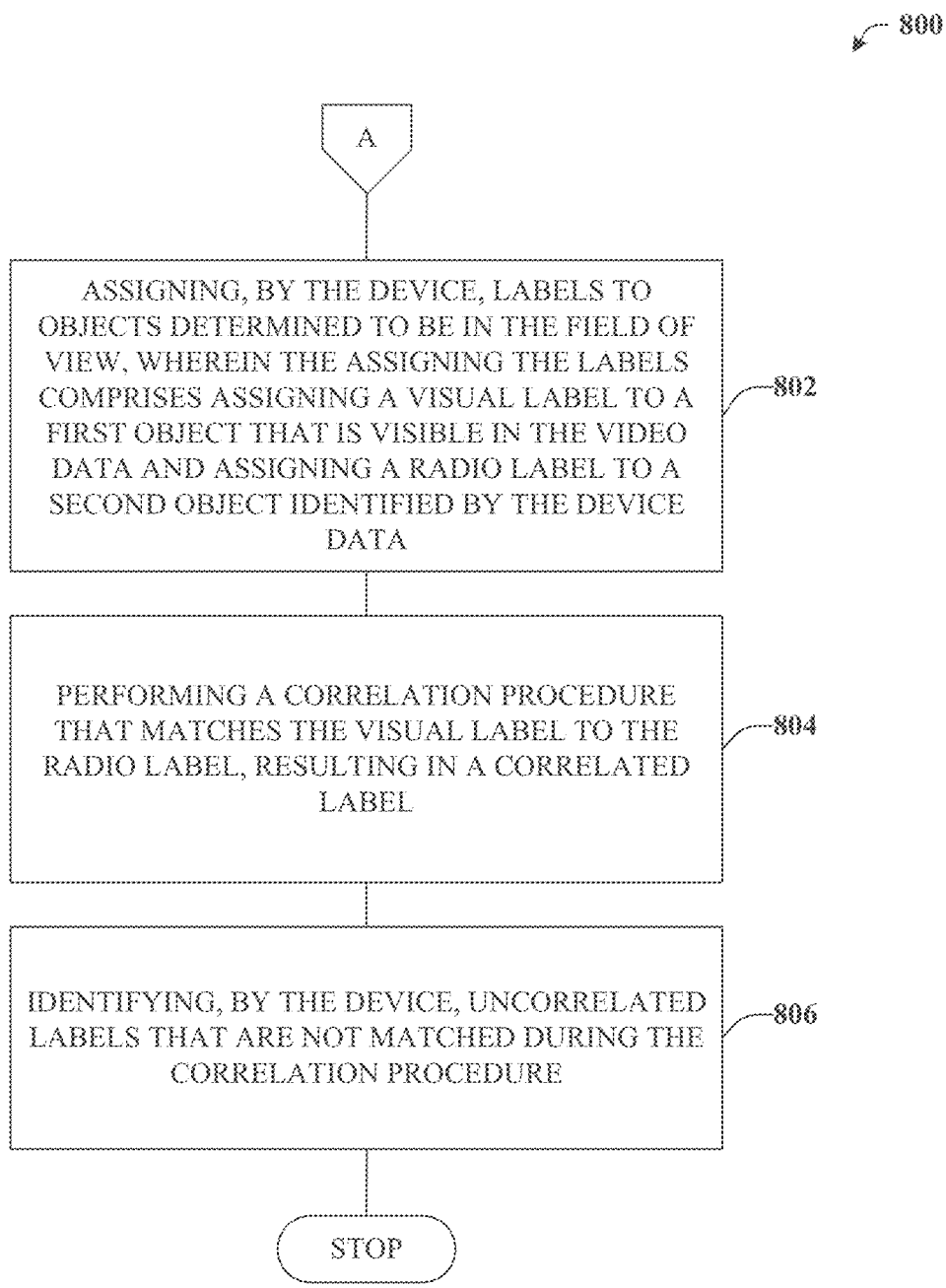
FIG. 8 illustrates an example methodology that can provide for additional elements or aspects in connection with correlation of visual objects to radio objects based on time-synchronized data in accordance with certain embodiments of this disclosure.

FIGS. 7 and 8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 7, exemplary method 700 is depicted. Method 700 can synchronize video data to radio device data in accordance with certain embodiments of this disclosure. For example, at reference numeral 702, a device comprising a processor can receive video data. The video data can be indicative of visual images of a field of view of a camera device.

At reference numeral 704, the device can receive a first signal from a wireless device, wherein the first signal is determined to originate from the field of view of the camera device. In some embodiments, second signals that originate from outside the field of view can be filtered such that the second signals are not received or are discarded or ignored. Such filtering can result from physical shielding or result from computation (e.g., software).

At reference numeral 706, the device can generate device data comprising device ID data and signal strength data. The device ID data can be indicative of an identifier of the wireless device. The signal strength data can be indicative of a signal strength metric (e.g., RSSI) of the first signal.

At reference numeral 708, the device can perform a time synchronization procedure. The time synchronization procedure can comprise synchronizing, according to time, the video data to the device data. Method 700 can proceed to insert A, which is further detailed in connection with FIG. 8, or stop.

With reference now to FIG. 8, exemplary method 800 is illustrated. Method 800 can provide for additional elements or aspects in connection with correlation of visual objects to radio objects based on time-synchronized data in accordance with certain embodiments of this disclosure. For example, at reference numeral 802, the device can assign labels to objects determined to be in the field of view. Assigning the labels can comprise assigning a visual label to a first object that is visible in the video data. Assigning the labels can further comprise assigning a radio label to a second object identified by the device data.

At reference numeral 804, the device can perform a correlation procedure that matches the visual label to the radio label, resulting in a correlated label. At reference numeral 806, the device can identify uncorrelated labels that are not matched during the correlation procedure. For example, in cases where a visual label cannot be correlated to a radio label or a radio label cannot be correlated with a visual label, then such can result in an uncorrelated label.

Example Operating Environments

Figure 9:
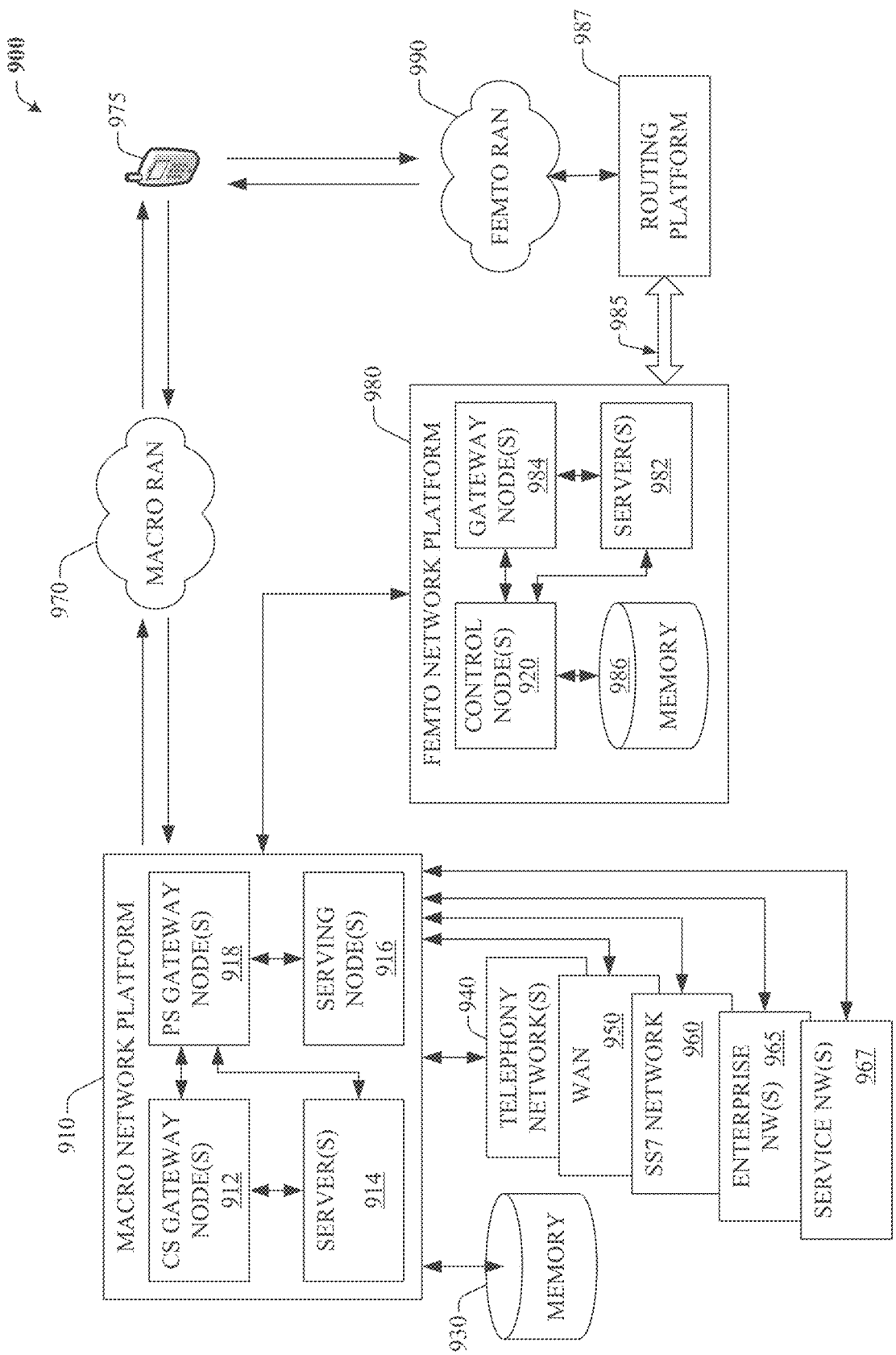
FIG. 9 illustrates a first example of a wireless communications environment with associated components that can be operable to execute certain embodiments of this disclosure.

To provide further context for various aspects of the subject specification, FIG. 9 illustrates an example wireless communication environment 900, with associated components that can enable operation of a femtocell enterprise network in accordance with aspects described herein. Wireless communication environment 900 comprises two wireless network platforms: (i) A macro network platform 910 that serves, or facilitates communication with, user equipment 975 via a macro radio access network (RAN) 970. It should be appreciated that in cellular wireless technologies (e.g., 4G, 3GPP UMTS, HSPA, 3GPP LTE, 3GPP UMB, 5G), macro network platform 910 is embodied in a Core Network. (ii) A femto network platform 980, which can provide communication with UE 975 through a femto RAN 990, linked to the femto network platform 980 through a routing platform 987 via backhaul pipe(s) 985. It should be appreciated that femto network platform 980 typically offloads UE 975 from macro network, once UE 975 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN 1370 can comprise various coverage cells, while femto RAN 990 can comprise multiple femto access points or multiple metro cell access points. As mentioned above, it is to be appreciated that deployment density in femto RAN 990 can be substantially higher than in macro RAN 970.

Generally, both macro and femto network platforms 910 and 980 comprise components, e.g., nodes, gateways, interfaces, servers, or platforms, that facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 910 comprises CS gateway node(s) 912 which can interface CS traffic received from legacy networks like telephony network(s) 940 (e.g., public switched telephone network (PSTN), or public land mobile network (PLMN)) or a SS7 network 960. Circuit switched gateway 912 can authorize and authenticate traffic (e.g., voice) arising from such networks. Additionally, CS gateway 912 can access mobility, or roaming, data generated through SS7 network 960; for instance, mobility data stored in a VLR, which can reside in memory 930. Moreover, CS gateway node(s) 912 interfaces CS-based traffic and signaling and gateway node(s) 918. As an example, in a 3GPP UMTS network, gateway node(s) 918 can be embodied in gateway GPRS support node(s) (GGSN).

In addition to receiving and processing CS-switched traffic and signaling, gateway node(s) 918 can authorize and authenticate PS-based data sessions with served (e.g., through macro RAN) wireless devices. Data sessions can comprise traffic exchange with networks external to the macro network platform 910, like wide area network(s) (WANs) 950; it should be appreciated that local area network(s) (LANs) can also be interfaced with macro network platform 910 through gateway node(s) 918. Gateway node(s) 918 generates packet data contexts when a data session is established. To that end, in an aspect, gateway node(s) 918 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 914. It is to be noted that in 3GPP UMTS network(s), gateway node(s) 1318 (e.g., GGSN) and tunnel interface (e.g., TTG) comprise a packet data gateway (PDG).

Macro network platform 910 also comprises serving node(s) 916 that convey the various packetized flows of information or data streams, received through gateway node(s) 918. As an example, in a 3GPP UMTS network, serving node(s) can be embodied in serving GPRS support node(s) (SGSN).

As indicated above, server(s) 914 in macro network platform 910 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 910. Data streams can be conveyed to gateway node(s) 918 for authorization/authentication and initiation of a data session, and to serving node(s) 916 for communication thereafter. Server(s) 914 can also effect security (e.g., implement one or more firewalls) of macro network platform 910 to ensure network's operation and data integrity in addition to authorization and authentication procedures that CS gateway node(s) 912 and gateway node(s) 918 can enact. Moreover, server(s) 914 can provision services from external network(s), e.g., WAN 950, or Global Positioning System (GPS) network(s) (not shown). It is to be noted that server(s) 914 can comprise one or more processor configured to confer at least in part the functionality of macro network platform 910. To that end, the one or more processor can execute code instructions stored in memory 930, for example.

In example wireless environment 900, memory 930 stores information related to operation of macro network platform 910. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 930 can also store information from at least one of telephony network(s) 940, WAN(s) 950, or SS7 network 960, enterprise NW(s) 965, or service NW(s) 967.

Femto gateway node(s) 984 have substantially the same functionality as PS gateway node(s) 918. Additionally, femto gateway node(s) 984 can also comprise substantially all functionality of serving node(s) 916. In an aspect, femto gateway node(s) 984 facilitates handover resolution, e.g., assessment and execution. Further, control node(s) 920 can receive handover requests and relay them to a handover component (not shown) via gateway node(s) 984. According to an aspect, control node(s) 920 can support RNC capabilities.

Server(s) 982 have substantially the same functionality as described in connection with server(s) 914. In an aspect, server(s) 982 can execute multiple application(s) that provide service (e.g., voice and data) to wireless devices served through femto RAN 990. Server(s) 982 can also provide security features to femto network platform. In addition, server(s) 982 can manage (e.g., schedule, queue, format . . . ) substantially all packetized flows (e.g., IP-based) it generates in addition to data received from macro network platform 910. It is to be noted that server(s) 982 can comprise one or more processor configured to confer at least in part the functionality of macro network platform 910. To that end, the one or more processor can execute code instructions stored in memory 986, for example.

Memory 986 can comprise information relevant to operation of the various components of femto network platform 980. For example, operational information that can be stored in memory 986 can comprise, but is not limited to, subscriber information; contracted services; maintenance and service records; femto cell configuration (e.g., devices served through femto RAN 990; access control lists, or white lists); service policies and specifications; privacy policies; add-on features; and so forth.

It is noted that femto network platform 980 and macro network platform 910 can be functionally connected through one or more reference link(s) or reference interface(s). In addition, femto network platform 980 can be functionally coupled directly (not illustrated) to one or more of external network(s) 940, 950, 960, 965 or 967. Reference link(s) or interface(s) can functionally link at least one of gateway node(s) 984 or server(s) 986 to the one or more external networks 940, 950, 960, 965 or 967.

Figure 10:
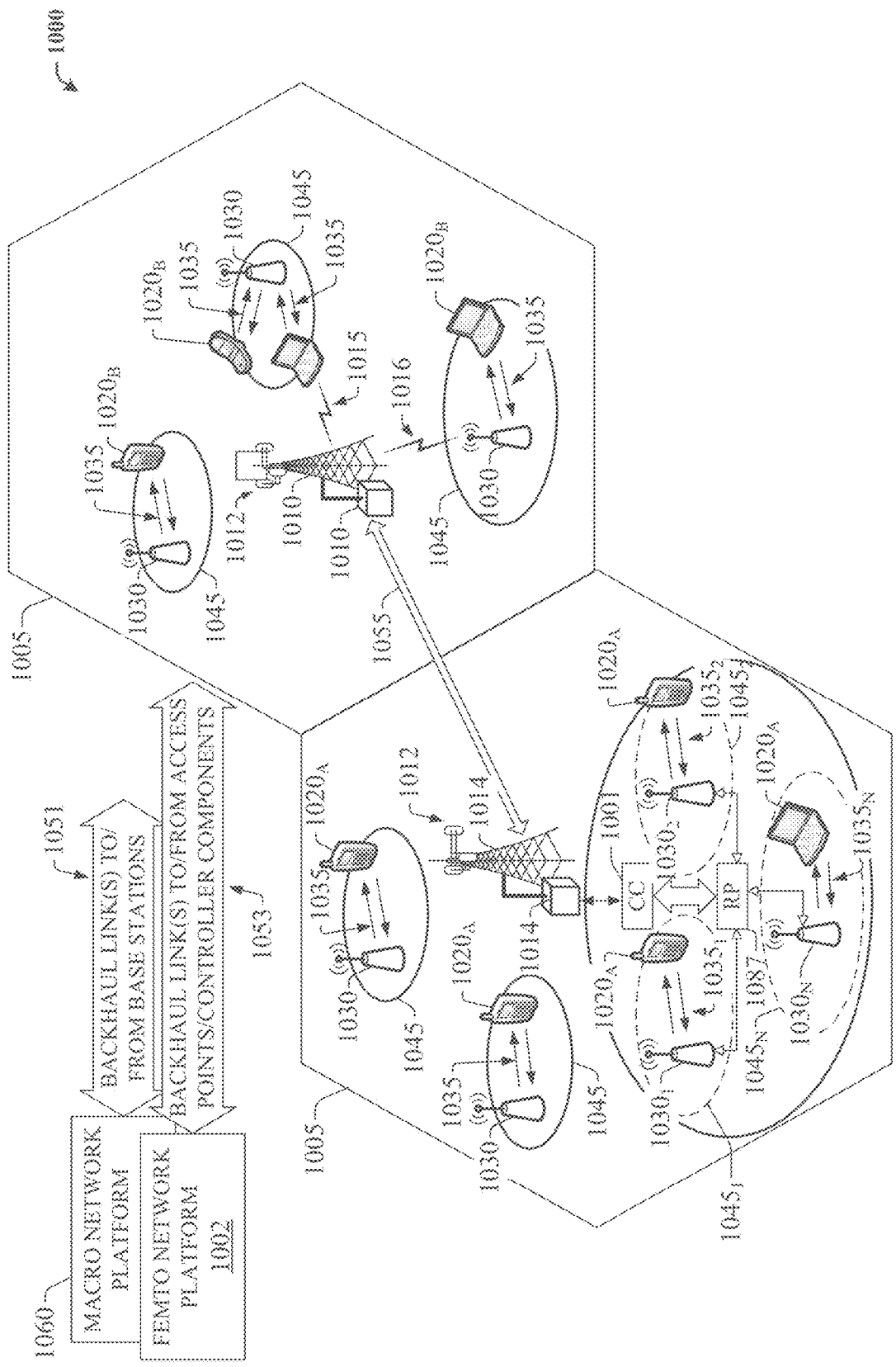
FIG. 10 illustrates a second example of a wireless communications environment with associated components that can be operable to execute certain embodiments of this disclosure.

FIG. 10 illustrates a wireless environment that comprises macro cells and femtocells for wireless coverage in accordance with aspects described herein. In wireless environment 1005, two areas represent "macro" cell coverage; each macro cell is served by a base station 1010. It can be appreciated that macro cell coverage area 1005 and base station 1010 can comprise functionality, as more fully described herein, for example, with regard to system 1000. Macro coverage is generally intended to serve mobile wireless devices, like UE $1020_A$, $1020_B$, in outdoors locations. An over-the-air (OTA) wireless link 1035 provides such coverage, the wireless link 1035 comprises a downlink (DL) and an uplink (UL), and utilizes a predetermined band, licensed or unlicensed, of the radio frequency (RF) spectrum. As an example, UE $1020_A$, $1020_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1010 communicates via backhaul link(s) 1051 with a macro network platform 1060, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1060 controls a set of base stations 1010 that serve either respective cells or a number of sectors within such cells. Base station 1010 comprises radio equipment 1014 for operation in one or more radio technologies, and a set of antennas 1012 (e.g., smart antennas, microwave antennas, satellite dish(es) . . . ) that can serve one or more sectors within a macro cell 1005. It is noted that a set of radio network control node(s), which can be a part of macro network platform 1060; a set of base stations (e.g., Node B 1010) that serve a set of macro cells 1005; electronics, circuitry or components associated with the base stations in the set of base stations; a set of respective OTA wireless links (e.g., links 1015 or 1016) operated in accordance to a radio technology through the base stations; and backhaul link(s) 1055 and 1051 form a macro radio access network (RAN). Macro network platform 1060 also communicates with other base stations (not shown) that serve other cells (not shown). Backhaul link(s) 1051 or 1053 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backhaul link. Backhaul pipe(s) 1055 link disparate base stations 1010. According to an aspect, backhaul link 1053 can connect multiple femto access points 1030 and/or controller components (CC) 1001 to the femto network platform 1002. In one example, multiple femto APs can be connected to a routing platform (RP) 1087, which in turn can be connect to a controller component (CC) 1001. Typically, the information from UEs $1020_A$ can be routed by the RP 1087, for example, internally, to another UE $1020_A$ connected to a disparate femto AP connected to the RP 1087, or, externally, to the femto network platform 1002 via the CC 1001, as discussed in detail supra.

In wireless environment 1005, within one or more macro cell(s) 1005, a set of femtocells 1045 served by respective femto access points (APs) 1030 can be deployed. It can be appreciated that, aspects of the subject innovation can be geared to femtocell deployments with substantive femto AP density, e.g., $10^4$-$10^7$ femto APs 1030 per base station 1010. According to an aspect, a set of femto access points $1030_1$-$1030_N$, with N a natural number, can be functionally connected to a routing platform 1087, which can be functionally coupled to a controller component 1001. The controller component 1001 can be operationally linked to the femto network platform 1002 by employing backhaul link(s) 1053. Accordingly, UE $1020_A$ connected to femto APs $1030_1$-$1030_N$ can communicate internally within the femto enterprise via the routing platform (RP) 1087 and/or can also communicate with the femto network platform 1002 via the RP 1087, controller component 1001 and the backhaul link(s) 1053. It can be appreciated that although only one femto enterprise is depicted in FIG. 10, multiple femto enterprise networks can be deployed within a macro cell 1005.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 10, in example embodiment 1000, base station AP 1010 can receive and transmit signal(s) (e.g., traffic and control signals) from and to wireless devices, access terminals, wireless ports and routers, etc., through a set of antennas $1012_1$-$1012_N$. It should be appreciated that while antennas $1012_1$-$1012_N$ are a part of communication platform 1025, which comprises electronic components and associated circuitry that provides for processing and manipulating of received signal(s) (e.g., a packet flow) and signal(s) (e.g., a broadcast control channel) to be transmitted. In an aspect, communication platform 1025 comprises a transmitter/receiver (e.g., a transceiver) 1066 that can convert signal(s) from analog format to digital format upon reception, and from digital format to analog format upon transmission. In addition, receiver/transmitter 1066 can divide a single data stream into multiple, parallel data streams, or perform the reciprocal operation. Coupled to transceiver 1066 is a multiplexer/demultiplexer 1067 that facilitates manipulation of signal in time and frequency space. Electronic component 1067 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1067 can scramble and spread information (e.g., codes) according to substantially any code known in the art; e.g., Hadamard-Walsh codes, Baker codes, Kasami codes, polyphase codes, and so on. A modulator/demodulator 1068 is also a part of operational group 1025, and can modulate information according to multiple modulation techniques, such as frequency modulation, amplitude modulation (e.g., M-ary quadrature amplitude modulation (QAM), with M a positive integer), phase-shift keying (PSK), and the like.

Figure 11:
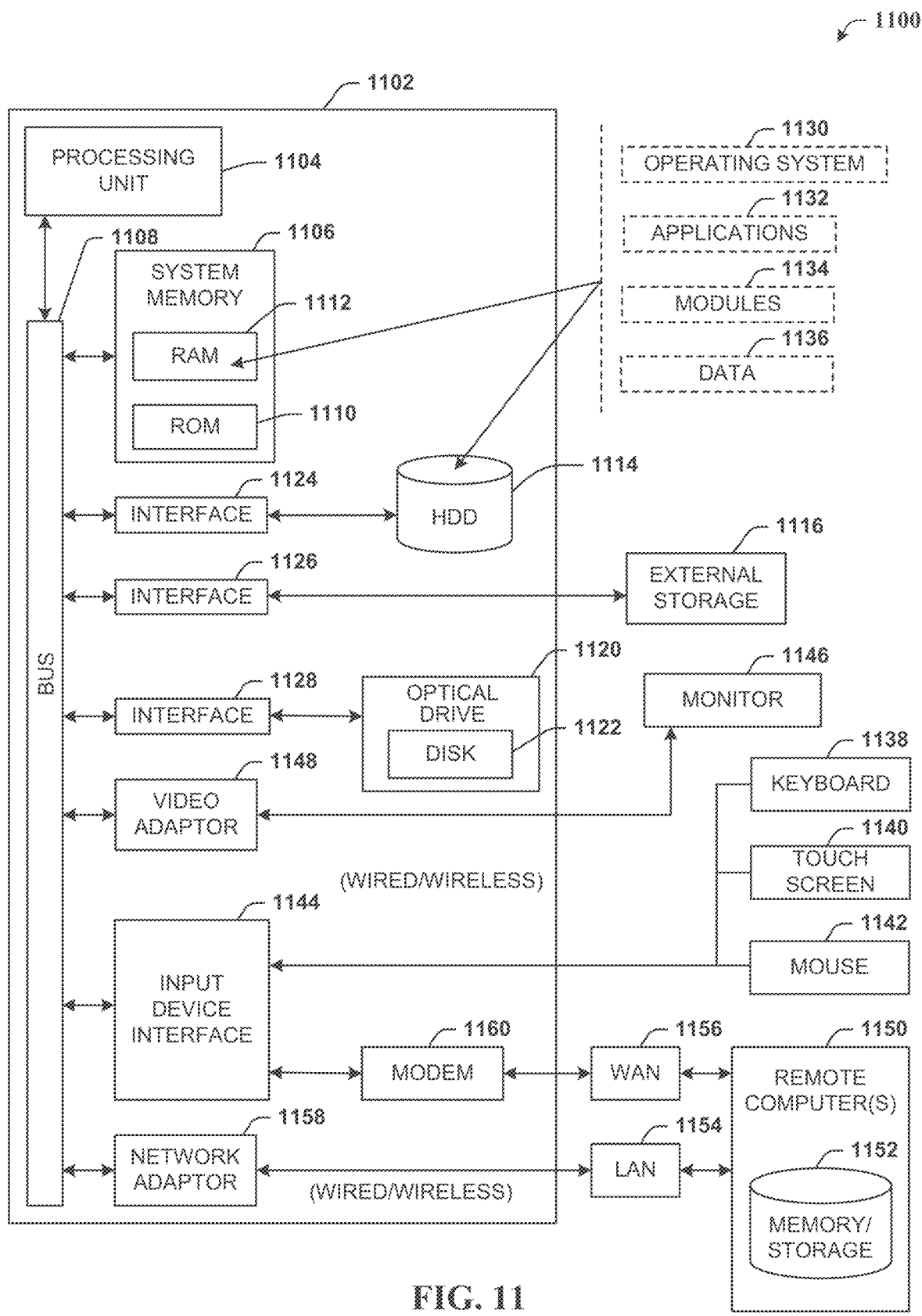
FIG. 11 illustrates an example block diagram of a computer operable to execute certain embodiments of this disclosure.

Referring now to FIG. 11, there is illustrated a block diagram of an exemplary computer system operable to execute the disclosed architecture. In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN)

1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A device, comprising:
a housing comprising a first portion configured to couple to a transceiver device and a second portion configured to couple to a camera device; and
a physical shielding device comprising:
an open portion through which the transceiver receives first signals from a wireless device determined to be in a field of view of the camera device; and
a covered portion comprising a material configured to prevent the transceiver device from receiving second signals from a direction that is determined to be outside the field of view of the camera device,
wherein the physical shielding device is configured to modify dimensions of the open portion in response to changes to the field of view of the camera device.

2. The device of claim 1, further comprising an adjustment device configured to:
change a first orientation of the camera device, resulting in a corresponding change to the field of view; and
change a second orientation of the physical shielding device corresponding to the first orientation.

3. The device of claim 1, further comprising the transceiver device and the camera device that generates video data indicative of visual images of the field of view of the camera device.

4. The device of claim 3, further comprising:
a processor; and
a memory that stores executable instructions that, when executed by the processor, facilitate performance of operations, comprising:
in response to receiving the first signals, generating device data, the device data comprising:
device identifier data indicative of an identifier of the wireless device; and
signal strength data indicative of a signal strength metric of the first signals; and
performing a time synchronization procedure comprising synchronizing, according to time, the video data and the device data.

5. The device of claim 4, wherein the operations further comprise assigning labels to objects determined to be in the field of view comprising assigning a visual label to a first object that is visible in the video data and assigning a radio label to a second object identified by the device data.

6. The device of claim 5, wherein the operations further comprise performing a correlation procedure that matches the visual label to the radio label, resulting in a correlated label.

7. The device of claim 6, wherein the correlation procedure comprises, based on the signal strength data, determining a distance to the wireless device and, in response to a determination that the wireless device is moving, determining a direction of travel of the wireless device and a rate of travel of the wireless device.

8. The device of claim 6, wherein the correlation procedure comprises performing an object recognition procedure that identifies a classification of an object in the video data and, based on the classification, determines whether the object is likely to exhibit locomotion.

9. The device of claim 6, wherein the correlation procedure comprises, based on a distance determination, matching a stationary wireless device to a stationary object in the field of view and, based on a direction of travel determination, matching a moving wireless device to a moving object in the field of view.

10. The device of claim 6, wherein the operations further comprise, based on a distance determination, matching a stationary wireless device to a station object in the field of view and, based on a direction of travel determination, matching a moving wireless device to a moving object in the field of view.

11. The device of claim 6, wherein the operations further comprise encrypting and storing the labels and corresponding histories of time-synched video data and device data to a data store.

12. The device of claim 11, wherein the correlation procedure comprises determining schedules for the labels based on the corresponding histories.

13. A device comprising:
a processor; and
a memory that stores executable instructions that, when executed by the processor, facilitate performance of operations, comprising:
receiving video data indicative of visual images of a field of view of a camera device;
receiving a first signal from a target device, wherein the first signal is determined to originate from the field of view of the camera device;
in response to receiving the first signal, generating device data, comprising:
device ID data indicative of an identifier of the wireless target device; and
signal strength data indicative of a signal strength metric of the first signal;
performing a time synchronization procedure comprising synchronizing, according to time, the video data and the device data; and
determining that the first signal originates from the field of view of the camera device based on signal filtering that filters a second signal that originates outside the field of view.

14. The device of claim 13, wherein the signal filtering comprises filtering the second signal in response to a trilateration that indicates the second signal originates outside the field of view.

15. The device of claim 13, wherein the signal filtering comprises filtering the second signal in response to a determination that the device data does not correspond to an object that is visible in the video data.

16. The device of claim 13, wherein the operations further comprise transmitting instructions to change an orientation of a physical shielding device that is configured to physically shield the wireless device from receiving the second signal, and wherein the instructions to change the orientation of the physical shielding device are in response to a change to the field of view of the camera device.

17. A method, comprising:
receiving, by a device comprising a processor, video data indicative of visual images of a field of view of a camera device;
receiving, by the processor, a first signal from a wireless device, wherein the first signal is determined to originate from the field of view of the camera device;
generating, by the processor, device data comprising device identification data indicative of an identifier of the wireless device and signal strength data indicative of a signal strength metric of the first signal;

performing, by the device, a time synchronization procedure comprising synchronizing, according to time, the video data to the device data; and determining that the first signal originates from the field of view of the camera device based on a signal filtering procedure that filters a second signal determined to originate outside the field of view.

18. The method of claim 17, further comprising assigning, by the device, labels to objects determined to be in the field of view, wherein assigning the labels comprises assigning a visual label to a first object that is visible in the video data and assigning a radio label to a second object identified by the device data.

19. The method of claim 18, further comprising performing a correlation procedure that matches the visual label to the radio label, resulting in a correlated label.

20. The method of claim 19, further comprising identifying, by the device, uncorrelated labels that are not matched during the correlation procedure.

* * * * *